United States Patent [19]

Kim

[11] 4,439,395
[45] Mar. 27, 1984

[54] NEUTRAL BEAMLINE WITH IMPROVED ION ENERGY RECOVERY

[75] Inventor: Jinchoon Kim, San Diego, Calif.

[73] Assignee: The United States of America as represented by the United States Department of Energy, Washington, D.C.

[21] Appl. No.: 253,953

[22] Filed: Apr. 13, 1981

[51] Int. Cl.³ ................................................ G21B 1/00
[52] U.S. Cl. .................................... 376/130; 376/147; 250/251
[58] Field of Search ............... 376/130, 127, 147, 129; 250/251, 396 ML; 315/111.3; 313/424, 363.1

[56] References Cited

U.S. PATENT DOCUMENTS

| | | | |
|---|---|---|---|
| 2,555,850 | 6/1951 | Glyptis | 313/424 |
| 2,617,060 | 11/1952 | De Gier | 313/424 |
| 2,617,061 | 11/1952 | De Gier | 313/424 |
| 3,030,543 | 4/1962 | Luce | 376/127 |
| 3,617,789 | 11/1971 | Middleton et al. | 376/129 |
| 3,663,360 | 5/1972 | Post . | |
| 3,668,065 | 6/1972 | Moir . | |
| 3,713,967 | 1/1973 | Hamilton et al. . | |
| 4,349,505 | 9/1982 | Stirling | 250/251 |

OTHER PUBLICATIONS

Nuclear Instruments and Methods, vol. 135, No. 2, Jun. 1976, pp. 203–209, Fumelli et al.
EUR–CEA–FC–823, 7/76, Association Euratom–CEA, France, P. Raimbault.
Proc. 7th Symp. on Eng. Prob. of Fusion Research, 1978, vol. 1, pp. 308–314, Barr et al.
Applied Physics Letters, 7/15/79, vol. 35(2), pp. 104–106, Stirling et al.
Proc. of 6th Symp. on Eng. Prob. of Fusion Research, San Diego, Calif. 1975, pp. 184–190, Bender et al.

*Primary Examiner*—Harvey E. Behrend
*Attorney, Agent, or Firm*—David E. Breeden; Stephen D. Hamel

[57] ABSTRACT

A neutral beamline employing direct energy recovery of unneutralized residual ions is provided which enhances the energy recovery of the full energy ion component of the beam exiting the neutralizer cell, and thus improves the overall neutral beamline efficiency. The unneutralized full energy ions exiting the neutralizer are deflected from the beam path and the electrons in the cell are blocked by a magnetic field applied transverse to the beam direction in the neutralizer exit region. The ions which are generated at essentially ground potential and accelerated through the neutralizer cell by a negative acceleration voltage are collected at ground potential. A neutralizer cell exit end region is provided which allows the magnetic and electric fields acting on the exiting ions to be loosely coupled. As a result, the fractional energy ions exiting the cell are reflected onto and collected at an interior wall of the neutralizer formed by the modified end geometry, and thus do not detract from the energy recovery efficiency of full energy ions exiting the cell. Electrons within the neutralizer are prevented from exiting the neutralizer end opening by the action of crossed fields drift ($\vec{E} \times \vec{B}$) and are terminated to a collector collar around the downstream opening of the neutralizer. The correct combination of the extended neutralizer end structure and the magnet region is designed so as to maximize the exit of full energy ions and to contain the fractional energy ions.

1 Claim, 4 Drawing Figures

NEUTRAL BEAMLINE WITH IMPROVED ION ENERGY RECOVERY

BACKGROUND OF THE INVENTION

This invention relates generally to neutral beam injection systems for use in controlled nuclear fusion devices such as Tokomaks, magnetic mirror systems, bumpy tori and the like, and, more particularly, this invention relates to improvements in neutral beam injectors with direct ion energy recovery.

In the field of controlled nuclear fusion, a high temperature plasma is formed of fusionable light isotope ions contained within a magnetic field confinement or containment zone, in an evacuated region. Such plasma may generally comprise one or more isotopes, such as hydrogen, deuterium, tritium, helium 3, etc., which undergo fusion reactions under appropriate conditions of confinement time, density, and temperature. These conditions may be brought about or supplemented by the injection of properly accelerated neutral particle beams of one or more of the appropriate species into the magnetically confined plasma. The injected particles must be neutral in order to penetrate the very strong magnetic field. These energetic neutral particles are subsequently ionized either by collision with the plasma ions or by action of the magnetic confinement field (Lorentz force), and are accordingly trapped to increase the plasma temperature in the magnetic containment zone.

Since the neutral particles cannot be directly accelerated to high velocity, i.e., high kinetic energies, they are produced in an indirect manner from an ion source. It has been the practice to produce a neutral beam by accelerating either positively or negatively charged ions of one or more of the above species emerging from an ion source, and by transporting them through a gas-cell neutralizer wherein they interact with background neutral atoms of the same species at a specified pressure through charge-exchange collisions. A certain portion of the energetic ions is converted into neutrals (or neutralized) as they emerge from the neutralizer. The ion-to-neutral conversion efficiency depends on the species and the beam energy. The positive ion-to-neutral efficiency decreases monotonically as the energy per nucleon increases, e.g., from 60% for 40 kilo electron volts (keV) to 15% for 100 keV per nucleon.

As future ion sources are developed toward energies of about 100 keV per nucleon, the efficiency of producing energetic neutral hydrogen isotopes from positive ions is intolerably low.

One way to improve the neutral beam injector efficiency is to recover the energy contained in the unneutralized residual ion fraction of the beam, which is otherwise wasted. In order to recover the kinetic energy of the unneutralized residual ion component of the beam emerging from the neutralizer cell in the form of usable electric energy, the beam ions must be diverted from the neutral beam passage, decelerated, and collected. The electrons present in the neutralizer cell must be blocked from entering the ion collector area since they would be accelerated into it, thereby producing an energy loss which may be equal to or greater than the recovered ion energy.

In the process of developing direct energy recovery in neutral beam injectors, various means have been devised or suggested, which may be generally divided into two groups, depending upon the ion deflection method used. They are either electrostatic or magnetic ion deflection methods.

An electrostatic deflection system is described in a paper by W. L. Barr et al, "Proceedings of 7th Symposium on Engineering Problems of Fusion Research", Vol. 1, page 308, 1978. This paper discloses an electrostatic system developed at Lawrence Livermore National Laboratory, Livermore, Calif., in which the neutralizer cell wall is held at ground potential, the ion beam collector is biased highly positive up to the initial beam energy, and the electrons emerging from the cell are repelled by a negative voltage (approximately 20 kV) applied to a set of electrodes which closely encompass the beam. One negative electrode is placed between the neutralizer cell exit and a funnel-shaped ion collector which also encompasses the beam. The other negative electrode is placed at the exit of the collector. The ion collector acts to decelerate and collect the ions diverging radially from the beam. For a successful electron blocking in this system, the negative electrodes must be biased sufficiently negative to drive the beam potential negative even on the axis in the presence of the positive-ion space-charge and the nearby positive-ion collector. There are inherent problems with this system which include a severe vacuum requirement for efficient direct conversion, increased beam-line length needed to collect most of the diverging and decelerating ions which consequently reduces the neutral power transmission efficiency, and uncertain trajectories of fractional energy ions. Low gas pressure is critically required since the slow ions and electrons produced by ionization and charge exchange of the background gas are likely to be drawn to these electrodes causing excessive power loading. The subsequent emission of secondary electrons from the surface of the negative electrodes would give rise to an additional power drain.

Other electrostatic electron-blocking and ion-collection systems utilizing electrostatic grids are discussed by P. Raimbault in EUR-CEA-FE-823, 1976. One specific system outlined in this reference employs a cylindrical grid arrangement which surrounds the beam exiting the neutralizer which is biased negative with respect to the neutralizer to suppress the electrons. This long cylindrical suppression grid is supposed to ease the higher negative voltage required to penetrate into the beam and to block the electrons. However, this scheme also suffers from direct interception of the ion beam on the negative potential, cylindrical grid. Not only is the ion energy lost, but secondary electrons ejected from the grid by the ion impingement constitute an additional power loss. In this system, unlike the former system, the ion source is operated at near ground potential, and the ions are accelerated by operating the neutralizer at a high-negative potential, which makes it possible to recover the energy of the ions by deceleration to ground potential.

Further, it has been suggested in the art to employ magnetic means for deflecting the ions from the neutral beam, and it has been further suggested to employ magnetic suppression, or blocking, of the electrons from emerging from the neutralizer tube. It has been recognized in the art that magnetic suppression would be advantageous in that the magnetic field can penetrate beams that are too thick and too dense for electrostatic supression to work. However, in the prior-art experiments employing magnetic suppression, there was no provision made to terminate the electrons, nor was there a strong enough magnetic field.

A U.S. Pat. No. 4,349,505, of common assignee with the present invention, filed July 1, 1980 by William L. Stirling for "Neutral Beam Line with Ion Energy Recovery Based on Magnetic Blocking of Electrons" discloses a system employing magnetic blocking of the electrons and electron collection at the neutralizer exit. The neutralizer is operated at a high-negative acceleration potential and the emerging ion beam experiences a strong electric field due to the surrounding ground potential structure which is transverse to the magnetic field applied across the beam at the neutralizer exit. Any electrons present in the beam-generated plasma in the neutralizer are quickly moved out of the beam due to $\bar{E}x\bar{B}$ field drift and directed into a slightly positive biased, electron collector. However, there exists a finite fraction of molecular ions (e.g., $H_2^+$ and $H_3^+$) along with the atomic ions in the extracted beam from the ion source. These molecular ions are mostly dissociated into atomic particles as they pass through the near-equilibrium gas cell, and thus these dissociated ion particles have kinetic energies of fractional values (one-half or one-third) with respect to the original full acceleration energy (E) of the atomic ions accelerated through the neutralizer and cannot reach the ground-potential surfaces on which the full energy (E) ions are collected. These fractional energy ions are deflected along paths of substantially smaller radius and, in a bad geometry, could impinge upon the outer walls of the neutralizer cell producing secondary electrons which cannot be suppressed from being accelerated to the surrounding ground potential surfaces.

Therefore, it will be appreciated that there is a need for improvements in neutral beamline systems with ion energy recovery based on the advantages of magnetic blocking of electrons and magnetic beam ion deflection. One particular need is to improve the handling of fractional energy ions to prevent their interferring with the recovery of the full energy ions when the fractional energy ions cannot be recovered readily. Further, improvement is needed to prevent full energy ions from prematurely deflecting onto the gas cell wall due to the close proximity of the magnet region to the neutralizer end region.

SUMMARY OF THE INVENTION

In view of the above needs, it is an object of this invention to provide an improved neutral beam injection system with unneutralized residual ion energy recovery based on magnetic blocking of electrons within the neutralizer gas cell.

Another object of this invention is to provide an improved neutral beam injection system as in the above object wherein the efficiency of direct energy recovery of full energy ions is enhanced.

Another object of this invention is to provide an improved neutral beam injection system as in the above objects wherein the efficiency is improved by preventing fractional energy ions from interferring with the full energy ion recovery.

Another object of this invention is to provide an improved neutral beam injection system as in the above objects which may be retrofit to existing neutral beam injectors, thereby increasing their electrical efficiency and high-power, long-pulse capability.

Additional objects, advantages, and features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, an improved neutral beam injection system is provided. Ions produced in an ion source operated near the ground potential are accelerated to a desired energy by a high negative potential applied on the neutralizer tube. Ions which are not converted into neutrals experience a retarding electric field developed between the end of the neutralizer and the surrounding ground surfaces. A transverse magnetic field (B) is provided in the exit region of the neutralizer. The magnetic field strength is sufficiently provided so as to block the electrons in the neutralizer from exiting by the action of the crossed fields drift and also to deflect the full energy ions and the fractional energy ions along separate paths. An electrically conductive structure defines the exit region of the neutralizer for providing an electric field shielding in such a way that fractional energy ions can be magnetically reflected back into the interior of the neutralizer while the full energy ions are deflected out of the neutralizer. A ground potential, full energy ion collector surface is provided in the path of the full energy ions deflected from the neutral beam path, which needs only a minimal cooling. The full energy ions are sufficiently decelerated and their charge is collected in the form of electric current which is returned to the high voltage power supply. Thus, their energy is not expended.

The structure defining the exit region of the neutralizer has a downstream opening corresponding to the paths of the neutral beam and the deflecting full energy ion beam. Around its opening is an electron collecting collar which is electrically biased slightly positive relative to the neutralizer tube to collect the electrons drifting from the neutralizer by an $\bar{E}x\bar{B}$ crossed fields force.

The geometry of the gas cell extension forming the electrically conductive structure defining the exit region of the neutralizer precludes any strong electric fields in the exit region where ions are bent by the magnetic field. The fractional energy ions are contained within the gas cell end structure and any secondary electrons emitted as a result of impingement of the fractional energy ions upon the internal surfaces of the extension are suppressed likewise and terminated on the electron collector ring. The wide opening of the neutralizer end structure toward the ion bending direction minimizes the wasteful loss of full energy ions bent into the neutralizer inner wall.

BRIEF DESCRIPTION OF THE DRAWINGS

The accompanying drawings, which are incorporated in and form a part of the specification, illustrate the present invention and, together with the description, serve to explain the principles of the invention. In the drawings.

DETAILED DESCRIPTION OF THE PREFERRED EMBODIMENT

Figure 1:
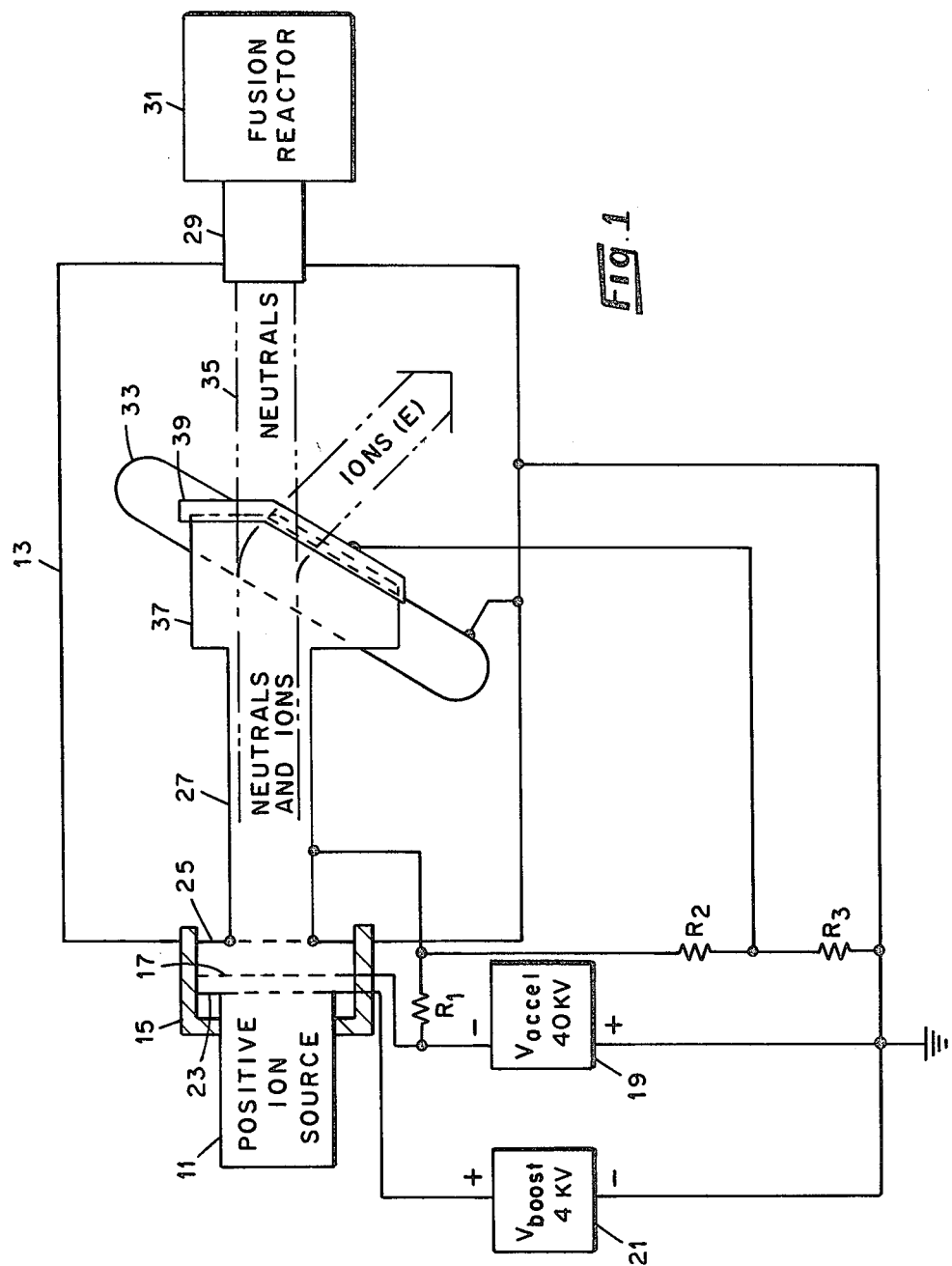
FIG. 1 is a schematic illustration of a neutral beam generator employing direct energy recovery of positive ions based on magnetic blocking of electrons in accordance with the present invention.

Referring now to FIG. 1, there is shown schematically a neutral beam system employing direct energy recovery of full energy (E) ions in accordance with the principles of the present invention. A light isotopic species positive ion source 11 is operated at essentially ground potential. The ion source may be mounted to a vacuum enclosure 13 for the beamline system by means of an electrical insulator and vacuum seal assembly 15. A plasma is generated in the source 11 containing the selected species positive ions (in the present case, hydrogen ions) which is accelerated by means of a $V_{accel}$ power supply 19. The value of the acceleration voltage $V_{accel}$ will depend upon the beam energy requirements and the ion source capability. For the illustration here $V_{accel}$ is 40 kV, which is typical for heating plasmas in the Princeton Large Torus or Impurity Study Experiment Tokamak.

The $V_{accel}$ source 19 is connected between ground and the extraction grid 17 of the source 11 so that the grid is biased negative with respect to ground. A slight boost voltage ($V_{boost}$), typically less than 4 kV, is applied by means of a power source 21 connected between ground and the plasma grid 23 of the ion source. The exit grid 25 of the ion source 11 is connected electrically to a gas neutralizer cell 27. The gas cell 27 and the exit grid 25 are operated slightly positive relative to the extraction grid 17, typically 1 kV ($V_{decel}$), to prevent electrons generated in the neutralizer cell 27 from drifting back into the ion source 11. This may be accomplished by resistively dividing the voltage from the power source 19 by means of appropriate resistors, $R_1$, $R_2$, and $R_3$. When the power source is pulsed on, an electric current flow through these resistors, thus providing the appropriate potentials. These voltages between various electrodes are slightly modified when ions are extracted.

It will be obvious that these voltages may be provided by separate power supplies floating on the $V_{accel}$ power source 19 to minimize the power loss associated with the current drained through the resistors.

Figure 2:
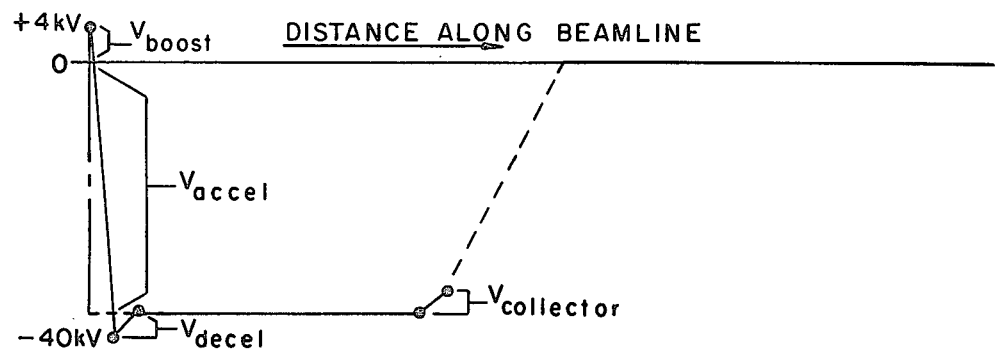
FIG. 2 is a plot of the operating potential of the various components along the beamline shown in FIG. 1.

Conversion of the accelerated ions into neutrals occurs inside the neutralizer 27 at a high negative potential. The neutral beam thus produced then travels through an evacuated drift duct 29 coupled to a neutral beam utilization device such as a fusion device 31. The unneutralized residual ions exiting the neutralizer experience first the magnetic bending force and then the retarding electric field developed between the neutralizer and the surroundings as illustrated in FIG. 2. Any ions arriving at the surrounding ground potential surface constitute an energy recovery, the kinetic energy of each recovered ion being only $eV_{boost}$. However, the crux of the problem in direct energy recovery concerns the electrons produced inside the neutralizer at high negative potential since the electric field is such that it attracts electrons toward the ground potential. These electrons loosely contained by the space charge field of the ion beam itself are prevented from leaking upstream toward the ion source by means of $V_{decel}$ between grids 17 and 25. Blocking the electrons from exiting through the downstream opening of the neutralizer is the key solution for the success of energy recovery.

Figure 3:
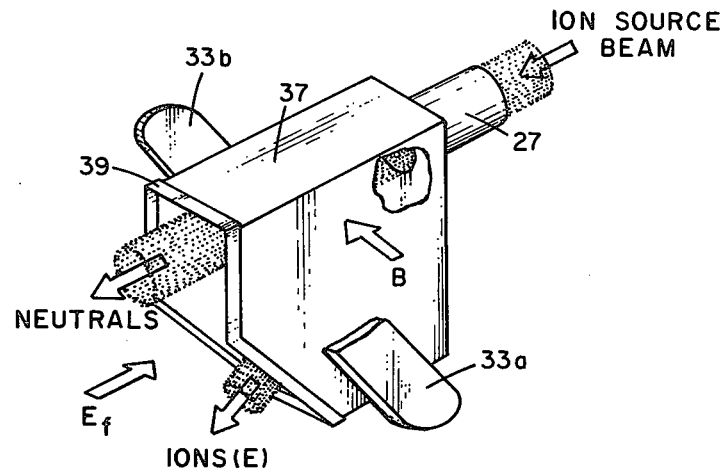
FIG. 3 is a perspective view of the gas neutralizer end structure made in accordance with the teachings of the present invention.
Figure 4:
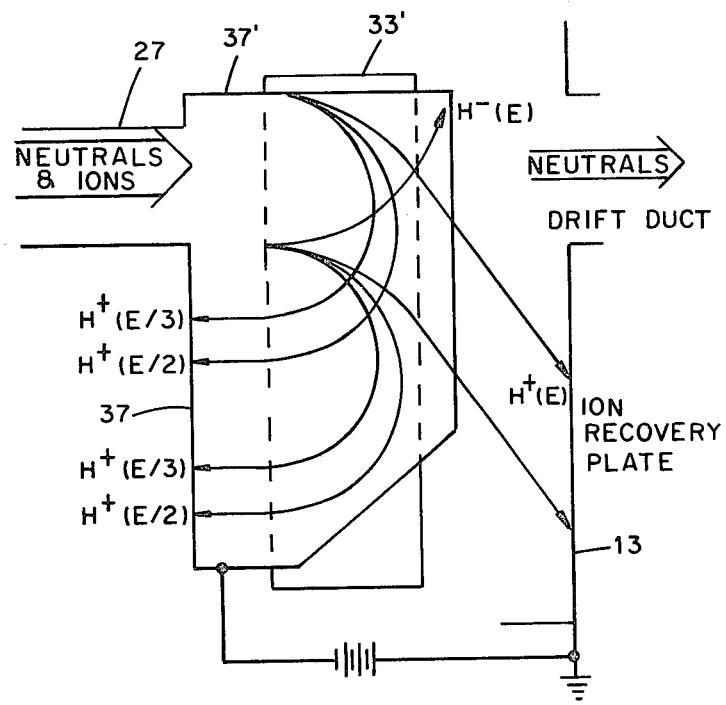
FIG. 4 is a schematic illustration of an alternate embodiment of the neutralizer end geometry of the magnet region conceivable from the teaching of this invention.

To accomplish electron blocking and ion deflection, a magnetic field is provided transverse to the beam in the exit end of the neutralizer tube 27. Referring now to FIG. 3 in conjunction with FIG. 1, it will be seen that the magnetic field (B) is provided by means of electromagnetic pole pieces 33, composed of pieces 33a and 33b, or equivalent magnetic field-producing means in juxtaposition across the beam path in the exit end region of the neutralizer 27, as shown more specifically in FIG. 3. The magnetic field may be varied to obtain the proper field strength to block the exit of electrons. The magnet pole pieces may be tilted at a 45° angle, as shown in FIG. 1 and FIG. 3, but a right angle orientation of the magnets as shown in FIG. 4 is preferred.

In accordance with the present invention, the exit region of the gas cell 27 is modified to provide more efficient energy recovery of the full energy ions. The end structure in the exit region is an electrically conductive metal box 37 with its forward (downstream) sides open for the passage of the neutral beam and the deflected full energy ions. The box 37 is formed of a nonmagnetic material such as copper. The downward extending side plates of the box structure parallel to the magnetic pole pieces overlap most of the magnet pole faces. With this geometry, both the electrons and residual ions within the extended neutralizer end structure experience the transverse magnetic field alone in the absence of any strong electric fields. An electron-collecting ring 39 is fastened around the opening downstream end of the box structure 37 by means of insulators (not shown) and extends a few centimeters beyond the opening. The collector 39 is also nonmagnetic and conforms to the open end geometry of the box 37.

The separation of the beam plasma electrons and the residual energetic ions begins at the entrance to the magnetic region in the exit structure of the neutralizer 27. Electrons tend to gyrate along the transverse magnetic flux lines, whereas ion trajectories are only bent. Any electric field owing to the ions moving away or to electric field penetration through the open downstream end of the end structure 37 is approximately perpendicular to the magnetic field, producing only $\vec{E} \times \vec{B}$ drifts of the electrons. Thus, electrons within the exit region eventually terminate either on the gas cell wall or at the collector ring 39 which is biased slightly positive with respect to the neutralizer cell 27 for sufficient attraction of the drifting electrons. This bias is provided by connecting the collector ring 39 to a voltage divider network formed of resistors $R_2$ and $R_3$. The electron collector 39 voltage is approximately one kilovolt positive with respect to the neutralizer cell 27. The full energy ions are immediately decelerated upon leaving the exit end of the neutralizer cell and their charge is collected at ground potential. It will be appreciated that the entire ground potential enclosure may be used for collecting these full energy ions and recovering their energy. The small positive ($V_{boost}$) potential from the power source 21 applied to the ion source plasma grid 23 ensures that the full energy ions deflected from the neutral beam have sufficient potential energy to reach the grounded collecting surfaces.

As pointed out above, the residual ions exiting the neutralizer cell 27 into the exit end structure 37 are not all full energy (E) ions but contain fractional energy ions due to molecular ions of the gas species entering the neutralizer from the ion source. In the case of a hydrogen source, as exemplified here, molecular ions ($H_2^+$ and $H_3^+$) extracted from the source 11 along with atomic ions ($H_1^+$) are dissociated into atomic particles as they pass through the neutralizer cell 27. These particles have energy of one-half (E/2) and one-third (E/3) respectively, of the original acceleration energy (E) and thus cannot reach the ground-potential surfaces on which the full energy ions are collected. Therefore, these ions are deflected from the beamline about substantially shorter radii than that of the full energy ions. This is illustrated in FIG. 4. If these ions are allowed to enter the vacuum region outside the neutralizer cell they tend to strike the outer wall of the neutralizer releasing their energy and generating secondary parasitic electrons. Since these electrons are born at the high negative potential, they will be accelerated to ground, detracting from the energy recovery. Under a proper range of magnetic field strengths, the lower-energy ions (E/2) and (E/3) are reflected into the inside walls of the gas cell formed by the downward extending end structure 37. Thus, electrons emitted from these fractional energy ions striking the inside wall of the neutralizer cell are blocked in the same way for the neutralizer electrons and collected by the electron collector ring 39 and do not exit with the full energy ions to degrade their energy recovery. The full energy ions are deflected from the neutral beam and leave the gas cell through the open downstream end. Another purpose of the downward extending structure is to minimize the loss of full energy ions on the wall caused by the magnetic bending.

The magnet pole pieces 33 need not be oriented at the approximately 45° angle shown in FIG. 1. As illustrated in FIG. 4 the magnet pole pieces 33' may be oriented vertically with added advantages such as the shorter downstream length and the simpler particle trajectories. The dimensions of the magnet poles, the magnetic field strength, and the geometry of the gas cell end structure are the primary parameters to vary in order to enhance the energy recovery for various kinetic energy levels. The electron collector is not shown in FIG. 4, but would be placed at the end of structure 37' as in FIG. 1. It will be noted that the top side of the gas cell end structure 37 is extended for the additional purpose of intercepting negative ions that are present in the beam as a result of charge-exchange collision processes along the neutralizer.

In operation, a system electrically biased, as shown in FIG. 1 and illustrated in FIG. 2, extracts ions from the ion source plasma generator 11 and accelerates them into the neutralizer cell 27. The residual full energy ions whose energy is to be recovered are magnetically deflected downward in the absence of any strong-retarding electric field. The fractional energy ions, whose energies are too low to be recovered, are controlled by the magnetic field alone and are reflected back into the interior wall of the gas cell formed by the downward extending portion of the end structure 37. The secondary electrons produced by the fractional energy ions striking the inner surface of the structure 37 are thus contained within the gas cell extension. The geometry of the gas cell extension 37 maximizes the escape of the full energy ions from the gas cell onto the ground potential recovery surfaces. Further, its open structure assists the pumping of hydrogen gas that streams out the gas cell exit.

The energy loss due to the termination of the electrons on the collector 39 is less than one keV per electron. The recovered ions impart only an energy corresponding to the boost voltage, which is kept as low as possible and lies between 2% and 10% of $V_{accel}$. The primary role of the boost voltage is to ensure that the full energy ions exiting the gas cell have enough energy to reach a grounded surface rather than reflect back into the neutralizer cell. Secondary electrons generated from the ground surface upon impingement of the recovered ions do not pose a problem since they are born approximately in the electric field-free region at ground potential.

As pointed out above, various light isotopic species may be used for the source of ions to be generated depending upon the particular reactor application requirements. The full energy ions are of primary interest for the purpose of energy recovery in accordance with this invention since the fractional energy ions cannot easily be recovered simultaneously. It is therefore desired to employ a ion source that can produce high atomic ion fraction in the beam. The ion source used in this example typically yields the atomic hydrogen ion species of 80 to 85%. In an experiment set up as shown in FIG. 1 to show the feasibility of this invention, an average full-energy ion recovery efficiency of about 80% was observed.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

I claim:

1. In for a neutral particle beam injector system wherein a neutral particle beam is generated and directed along a beamline, including a substantially ground-potential-operated ion source from which ions of a selected isotopic species are accelerated to a desired kinetic energy level along said beamline through a neutralizer, said neutralizer being operated at a selected ion acceleration potential relative to said ion source to provide said desired kinetic energy level and wherein a significant portion of said ions are converted into energetic neutral particles together with electrons, full kinetic energy atomic ions and fractional kinetic energy atomic ions derived from molecular ions of said selected species accelerated into said neutralizer, an ion energy recovery system including a magnetic field generating means for producing a magnetic field (B) transverse to said beamline in a beam exit region at the beam exit end of said neutralizer and of sufficient strength to substantially block electrons from exiting said neutralizer and deflecting said full energy ions from said beamline along separate paths from said beamline, and at least one ground potential full energy ion charge collector surface disposed in the path of the full energy ions deflected from said beamline for decelerating and collecting the charge from said full energy ions directed to said ion collector, the improvement in said ion energy recovery system comprising:

a non-magnetic, electrically conductive enclosing structure attached to and forming an enlarged exit end of said neutralizer at said exit region of said neutralizer, said structure being operated at the same potential as said neutralizer to form an electric field shield about said exit region defined by said structure, said structure having a pair of opposite sides which extend in parallel planes perpendicular to said magnetic field (B), said structure having a down stream opening along the paths of said beamline and the full energy ions deflected from said beamline, said structure having an upstream surface extending from the exit end of said neutralizer perpendicular to said beamline and in a direction toward the direction of said ions deflected from said beamline so that the fractional energy ions are magnetically reflected back onto the inner walls of said enclosing structure while said full energy ions which are deflected from said beamline and neutral particles pass out of said downstream end opening of said structure; wherein said magnetic field generating means includes a pair of magnet pole pieces disposed on opposite sides of said enclosing structure parallel to said pair of opposite sides of said enclosing structure, said pole piece being operated at ground potential and electrically insulatably spaced from said sides of said enclosing structure so that said enclosing structure side walls electrically shield said exit region from electric fields induced by the close proximity of the ground operated magnetic pole pieces, said enclosing structure being an electrically conducting metal box of generally rectangular shape having its downstream end open along a path extending transversely to said beamline and the path of said full energy ions exiting said exit region; said source being a positive ion source and further including a power source connected between said neutralizer and ground potential for applying a negative acceleration voltage to said neutralizer and said box structure relative to said ion source; said neutral beam injector including an electrically conductive vacuum containment vessel enclosing said beamline therein, said vessel having a beam exit drift tube adapted for passage of said energetic neutral particle beam exiting said vessel, said vessel being connected to ground potential and comprises one of said at least one ground potential ion collector surface; and an electron collecting means for collecting electrons which tend to exit said downstream opening of said enclosing structure said electron collecting means including an electrically conductive collar uniformly insulatably spaced from said box structure and disposed about said downstream opening of said box structure, said collar extending downstream beyond said downstream opening of said box structure and biased sufficiently positive relative to said box structure to intercept electrons which are forced to drift toward said collector due to the transverse magnetic and electric fields present at said downstream opening of said box structure.

* * * * *